United States Patent [19]

Fushimi et al.

[11] Patent Number: 5,476,825
[45] Date of Patent: Dec. 19, 1995

[54] CATALYST FOR POLYMERIZATION OF OLEFIN AND PROCESS FOR PRODUCING OLEFIN POLYMER

[75] Inventors: Masaki Fushimi; Toshio Fujita; Minoru Suzuki, all of Oita, Japan

[73] Assignee: Showa Denko K.K., Tokyo, Japan

[21] Appl. No.: 85,901

[22] Filed: Jul. 6, 1993

[30] Foreign Application Priority Data

Jul. 6, 1992 [JP] Japan .................... 4-178545

[51] Int. Cl.$^6$ .................... B01J 31/00
[52] U.S. Cl. .................... 502/124; 502/122; 502/123; 502/125; 502/126; 502/127
[58] Field of Search .................... 502/125, 126, 502/127, 124, 123, 122

[56] References Cited

U.S. PATENT DOCUMENTS 4,814,314  3/1989  Matsuura et al. .................... 502/113
4,816,433  3/1989  Terano et al. .................... 502/125
4,990,477  2/1991  Kioka et al. .................... 502/125
5,023,223  6/1991  Ebara et al. .................... 502/125
5,189,124  2/1993  Sasaki et al. .................... 502/125

Primary Examiner—E. Rollins Cross
Assistant Examiner—E. D. Irzinski
Attorney, Agent, or Firm—Sughrue, Mion, Zinn, Macpeak & Seas

[57] ABSTRACT

A catalyst for polymerization of olefin, which is capable of producing an olefin polymer with high stereoregularity and narrow molecular weight distribution, and which comprises (1) a solid catalyst component essentially containing titanium, magnesium and halogen, 2) an organoaluminum compound, and (3) a contact product of (A) an organometallic compound and (B) an organosilicon compound; and a process for producing a polymer using the above catalyst.

11 Claims, No Drawings

CATALYST FOR POLYMERIZATION OF OLEFIN AND PROCESS FOR PRODUCING OLEFIN POLYMER

FIELD OF THE INVENTION

This invention relates to a catalyst for polymerization of olefins to produce a polymer having high stereoregularity and narrow molecular weight distribution in a high yield and a process for producing an olefin polymer using the same. More particularly, it relates to a Ziegler catalyst-on-carrier comprising, as a cocatalyst, a contact product of an organosilicon compound having a C3 axis of symmetry in the molecule thereof and an organometallic compound having boron or aluminum as a central metal (Lewis acid compound) and a process for producing an olefin polymer using the same.

BACKGROUND OF THE INVENTION

Properties of olefin polymers are determined by molecular weight distribution and stereoregularity. Among others, olefin polymers having narrow molecular distribution are of high practical utility in the field of injection molding because of their high flexual modules, impact resistance and heat distortion resistance.

Ziegler-Natta catalyst carrying magnesium chloride which is widely employed in industry contains an organosilicon compound as a cocatalyst component (see JP-A-57-63310, JP-A-58-63311, JP-A-58-138708, JP-A-58-83006, JP-A-61-296006, JP-A-62-11705, JP-A-62-18406, JP-A-62-20507, JP-A-63-92615, JP-A-63-175008, JP-A-63-258907, JP-A-63-289004, JP-A-2-70708, JP-A-2-163104, JP-A-2-170803, JP-A-2-173010, JP-A-3-119004, JP-A-3-33102, JP-A-3-33103, JP-A-3-33105, and JP-A-3-33106; the term "JP-A" as used herein means an "unexamined published Japanese patent application").

Olefin polymers produced using these catalyst systems usually have a molecular weight distribution of more than 19 as expressed in terms of a ratio of high-load melt index (HLMFR) measured under a load of 10 kg to melt index (MFR) measured under a load of 2.16 kg, HLMFR/MFR. The higher the HLMFR/MFR, the broader the molecular weight distribution. It is well known that olefin polymers with narrow molecular weight distribution are preferred for production of monofilaments in good demand in industry. For the time being, olefin polymers having narrow molecular weight distribution, i.e., HLMFR/MFR of less than 19, have been produced by visbreaking of an olefin polymer using a peroxide. However, visbreaking is difficult to control so that complicated processing is required and reproducibility is low. Besides, visbreaking of olefin polymers, especially propylene polymers tend to be attended by reduction in stereoregularity.

Some improvements on Ziegler-Natta catalysts have recently been proposed for obtaining olefin polymers with narrower molecular weight distribution as disclosed in JP-A-59-64602, JP-A-59-207904, JP-A-60-1041902, JP-A-61-126110, JP-A-62-104812, JP-A-63-199207, JP-A-1-54008, JP-A-2-70708, and JP-A-3-47806. However, any of the olefin polymers obtained by these processes has a stereoregularity (a proportion of boiling heptane-insoluble matter) of 97% at the highest, still meeting difficulty in reaching high rigidity as demanded today.

On the other hand, it is possible to obtain an olefin polymer with narrow molecular weight distribution by using a Kaminsky type homogeneous catalyst system as described in, for example, JP-A-63-295607. However, since this catalyst system needs a large quantity of very expensive aluminoxane, it has not yet come into industrial use.

SUMMARY OF THE INVENTION

An object of the present invention is to solve the above-mentioned outstanding problems associated with conventional techniques for polyolefin production using a Ziegler catalyst-on-carrier and to provide a process for producing an olefin polymer having high activity, high melting point, high stereoregularity and narrow molecular weight distribution and a catalyst for polymerization of olefins.

The present inventors have conducted extensive investigations with the above objects in mind. As a result, they have found that the above-mentioned problems can be solved and a polymer of excellent practical utility can be obtained by using a catalyst for polymerization of olefins, comprising (1) a solid catalyst component essentially containing titanium, magnesium, and a halogen atom, (2) an organoaluminum compound, and (3) a contact product obtained by contacting (A) an organometallic compound represented by formula (1):

$$X(R^1)(R^2)(R^3) \qquad (1)$$

wherein X represents a boron atom or an aluminum atom; and $R^1$, $R^2$, and $R^3$ each represents a hydrocarbon group having from 3 to 10 carbon atoms or a hydrogen atom, and (B) an organosilicon compound represented by formula (2):

$$(R^4O)_3-Si-\underset{\underset{R^5}{|}}{\overset{\overset{R^5}{|}}{C}}-R^5 \qquad (2)$$

wherein $R^4$ and $R^5$ each represents an alkyl group having from 1 to 3 carbon atoms, at a (A) to (B) molar ratio of from 0.5/1 to 5/1 at a temperature of not higher than 50° C. for a contact time of not more than 10 hours. The present invention has been completed based on this finding.

The effects of the present invention were first realized by previously bringing an organosilicon compound having a specific structure (specifically a trialkoxysilane compound having a C3 axis of symmetry in the molecule thereof as represented by formula (2)) as a cocatalyst component, particularly as an external donor, into contact with a Lewis acid compound represented by formula (1).

DETAILED DESCRIPTION OF THE INVENTION

The present invention will be explained below in greater detail.

Magnesium compounds which can be used in preparation of solid catalyst component (1) of the present invention include magnesium halides, e.g., magnesium chloride and magnesium bromide; magnesium alkoxides, e.g., magnesium ethoxide and magnesium isopropoxide; magnesium carboxylates, e.g., magnesium laurate and magnesium stearate; and alkylmagnesium compounds, e.g., butylethylmagnesium; and mixtures of two or more thereof. Preferred magnesium compounds are magnesium halides or compounds capable of forming a magnesium halide upon catalyst preparation, and particularly those containing chlorine as a halogen atom.

Titanium compounds which can be used in preparation of solid catalyst component (1) of the present invention include titanium halides, e.g., titanium tetrachloride and titanium trichloride; titanium alkoxides, e.g., titanium butoxide and titanium ethoxide; alkoxytitanium halides, e.g., phenoxytitanium chloride; and mixtures of two or more thereof.

Halogen-containing compounds which can be used in preparation of solid catalyst component (1) of the present invention include those containing fluorine, chlorine, bromine or iodine, and preferably chlorine as a halogen atom. Typical examples of the halogen-containing compounds are titanium halides, e.g., titanium tetrachloride and titanium tetrabromide; silicon halides, e.g., silicon tetrachloride and silicon tetrabromide; and phosphorous halides, e.g., phosphorus trichloride and phosphorus pentachloride. In some processes of preparation, halogenated hydrocarbons, halogen molecules or hydrohalogenic acids (e.g., HCl, HBr or HI) may be employed. These halogen-containing compounds may overlap the titanium compounds or magnesium compounds.

In preparing solid catalyst component (1), an electron donating compound, such as an oxygen-containing compound or a nitrogen-containing compound, is preferably used as an internal donor. Examples of suitable electron donating compounds include (i) alcohols having from 1 to 20 carbon atoms, e.g., methanol, ethanol, propanol, butanol, heptanol, hexanol, octanol, dodecanol, octadecyl alcohol, 2-ethylhexyl alcohol, benzyl alcohol, cumyl alcohol, diphenylmethanol, and tridiphenylmethanol; (ii) phenols having from 6 to 25 carbon atoms which may be substituted with an alkyl group, e.g., phenol, cresol, ethylphenol, propylphenol, cumylphenol, nonylphenol, and naphthol; (iii) ketones having from 3 to 15 carbon atoms, e.g., acetone, methyl ethyl ketone, methyl isobutyl ketone, acetophenone, and cyclohexanone; (iv) aldehydes having from 2 to 15 carbon atoms, e.g., acetaldehyde, propionaldehyde, tolualdehyde, and naphthaldehyde; (v) organic acid esters having from 2 to 20 carbon atoms, e.g., methyl formate, ethyl formate, methyl acetate, ethyl acetate, propyl acetate, octyl acetate, cyclohexyl acetate, methyl cellosolve acetate, cellosolve acetate, ethyl propionate, methyl n-butyrate, methyl isobutyrate, ethyl isobutyrate, isopropyl isobutyrate, ethyl valerate, butyl valerate, ethyl stearate, methyl chloroacetate, ethyl dichloroacetate, methyl methacrylate, ethyl methacrylate, ethyl crotonate, ethyl cyclohexanecarboxylate, methyl phenylacetate, methyl phenylbutyrate, propyl phenylbutyrate, propyl phenylbutyrate, methyl benzoate, ethyl benzoate, propyl benzoate, butyl benzoate, octyl benzoate, cyclohexyl benzoate, phenyl benzoate, benzyl benzoate, cellosolve benzoate, methyl toluylate, ethyl toluylate, amyl toluylate, ethyl ethylbenzoate, methyl anisate, ethyl anisate, ethyl ethoxybenzoate, diethyl phthalate, diisobutyl phthalate, diheptyl phthalate, dineopentyl phthalate, γ-butyrolactone, γ-valerolactone, coumalin phthalide, diethyl carbonate, methyl orthoformate, and ethyl orthoformate; (vi) alkoxy acid esters, e.g., methyl methoxyacetate, ethyl methoxyacetate, butyl methoxyacetate, phenyl methoxyacetate, methyl ethoxyacetate, ethyl ethoxyacetate, butyl ethoxyacetate, phenyl ethoxyacetate, ethyl n-propoxyacetate, ethyl isopropoxyacetate, methyl n-butoxyacetate, ethyl isobutoxyacetate, ethyl n-hexyloxyacetate, octyl sec-hexyloxyacetate, methyl 2-methylcyclohexyloxyacetate, methyl 3-methoxypropionate, ethyl 3-methoxypropionate, butyl 3-methoxypropionate, ethyl 3-ethoxypropionate, butyl 3-ethoxypropionate, n-octyl 3-ethoxypropionate, dodecyl 3-ethoxypropionate, pentamethylphenyl 3-ethoxypropionate, ethyl 3-isopropoxypropionate, butyl 3-isopropoxypropionate, allyl 3-(n-propoxy)propionate, cyclohexyl 3-(n-butoxy)propionate, ethyl 3-neopentyloxypropionate, butyl 3-(n-octyloxy)propionate, octyl 3-(2,6-dimethyldecyloxy)propionate, ethyl 4-ethoxyacetate, cyclohexyl 4-ethoxybutyrate, octyl 5-(n-propoxy)valerate, ethyl 12-ethoxylaurate, ethyl 3-(1-indenoxy)propionate, methyl 3-methoxyacrylate, methyl 2-ethoxyacrylate, ethyl 3-phenoxyacrylate, ethyl 2-methoxypropionate, n-butyl 2-isopropoxybutyrate, methyl 2-ethoxyisobutyrate, phenyl 2-cyclohexyloxyisovalerate, butyl 2-ethoxy-2-phenylacetate, allyl 3-neopentyloxybutyrate, methyl 3-ethoxy-3-(o-methylphenyl)propionate, ethyl 3-ethoxy-2-(o-methylphenyl)propionate, ethyl 4-ethoxy-2-methyl-1-naphthylnonanoate, ethyl 2-methoxycyclopentanecarboxylate, butyl 2-ethoxycyclohexanecarboxylate, isopropyl 3-(ethoxymethyl)-tetralin-2-acetate, ethyl 8-butoxy-decalin-1-carboxylate, methyl 3-ethoxynorbornane-2-carboxylate, methyl 2-phenoxyacetate, ethyl 3-(p-cresoxy)propionate, methyl 4-(2-naphthoxy)butyrate, butyl 5-carbaloxyvalerate, methyl 2-phenoxypropionate, ethyl 3-(4-methylphenoxy)-2-phenylpropionate, ethyl 2-phenoxycyclohexanecarboxylate, ethyl thiophen-3-oxyacetate, ethyl 2-(2-picolinoxymethyl)cyclohexanecarboxylate, and ethyl 3-furfuryloxypropionate; (vii) ketonic acid esters, e.g., methyl acetoacetate, ethyl acetoacetate, butyl acetoacetate, methyl propionylacetate, phenyl acetoacetate, methyl propionylacetate, ethyl propionylacetate, phenyl propionylacetate, butyl propionylacetate, ethyl butyrylacetate, ethyl isobutanoylacetate, ethyl pentanoylacetate, methyl 3-acetylpropionate, ethyl 3-acetylpropionate, butyl 3-acetylpropionate, ethyl 3-propionylpropionate, butyl 3-propionylpropionate, n-octyl 3-propionylpropionate, dodecyl 3-propionylpropionate, pentamethylphenyl 3-propionylpropionate, ethyl 3-isopropionylpropionate, butyl 3-isopropionylpropionate, allyl 3-isopropionylpropionate, cyclohexyl 3-isopropionylpropionate, ethyl 3-neopentanoylpropionate, butyl 3-n-laurylpropionate, methyl 3-(2,6-dimethylhexanoyl)propionate, ethyl 4-propionylacetate, cyclohexyl 4-propionylbutyrate, octyl 5-butyrylvalerate, ethyl 12-butyryllaurate, methyl 3-acetylacrylate, methyl 2-acetylacrylate, ethyl 3-benzoylpropionate, methyl 3-benzoylpropionate, ethyl 3-methylbenzoylpropionate, butyl 3-toluylbutyrate, ethyl o-benzoylbenzoate, ethyl m-benzoylbenzoate, ethyl p-benzoylbenzoate, butyl o-toluylbenzoate, ethyl o-toluylbenzoate, ethyl m-toluylbenzoate, ethyl p-toluylbenzoate, ethyl o-(2,4,6-trimethylbenzoyl)benzoate, ethyl m-(2,4,6-trimethylbenzoyl)benzoate, ethyl p-(2,4,6-trimethylbenzoyl)benzoate, ethyl o-ethylbenzoylbenzoate, ethyl o-acetylbenzoate, ethyl o-propionylbenzoate, ethyl o-laurylbenzoate, ethyl o-cyclohexanoylbenzoate, and ethyl o-dodecylbenzoate; (viii) inorganic acid esters, e.g., methyl borate, butyl titanate, butyl phosphate, diethyl phosphite, and di(2-phenylphenyl)phosphorochloridate; (ix) ethers having from 2 to 25 carbon atoms, e.g., methyl ether, ethyl ether, isopropyl ether, butyl ether, amyl ether, tetrahydrofuran, anisole, diphenyl ether, ethylene glycol diethyl ether, ethylene glycol diphenyl ether, and 2,2-dimethoxypropane; (x) acid amides having from 2 to 20 carbon atoms, e.g., acetamide, benzoic acid amide, and toluylic acid amide; (xi) acid halides having from 2 to 20 carbon atoms, e.g., acetyl chloride, benzoyl chloride, toluylic acid chloride, anisic acid chloride, phthaloyl chloride, and isophthaloyl chloride; (xii) acid anhydrides having from 2 to 20 carbon atoms, e.g., acetic anhydride and phthalic anhydride; (xiii) amines having from 1 to 20 carbon atoms, e.g., monomethylamine, monoethylamine, diethylamine, tributylamine, piperidine, tribenzylamine, aniline, pyridine, picoline, and tetramethylethylenediamine; (xiv)

nitriles having from 2 to 20 carbon atoms, e.g., acetonitrile, benzonitrile, and trinitrile; (xv) thiols having from 2 to 20 carbon atoms, e.g., ethyl thioalcohol, butyl thioalcohol, and phenylthiol; (xvi) thioethers having from 4 to 25 carbon atoms, e.g., diethyl thioether and diphenyl thioether; (xvii) sulfuric esters having from 2 to 20 carbon atoms, e.g., dimethyl sulfate and diethyl sulfate; (xviii) sulfonic acids having from 2 to 20 carbon atoms, e.g., phenylmethylsulfone and diphenylsulfone; and (xix) silicon-containing compounds having from 2 to 24 carbon atoms, e.g., phenyltrimethoxysilane, phenyltriethoxysilane, phenyltributoxysilane, vinyltriethoxysilane, diphenyldiethoxysilane, phenyldimethylmethoxysilane, phenyldimethylethoxysilane, triphenylmethoxysilane, hexamethyldisiloxane, octamethyltrisiloxane, trimethylsilanol, phenyldimethylsilanol, triphenylsilanol, diphenylsilanediol, and ortho silicate (having a lower alkyl group). These electron donating compounds may be used in combination of two or more thereof. Preferred among them are organic acid esters, alkoxy acid esters, and ketonic acid esters.

While not limiting, solid catalyst component (1) which can be used in the present invention is prepared by (i) a process comprising co-grinding a magnesium halide, a titanium halide, and an electron donating compound or dispersing or dissolving these compounds in an organic solvent (e.g., hydrocarbons, halogenated hydrocarbons, and alcohols); (ii) a process comprising preparing a composite of a magnesium halide and an organic or inorganic compound, which may contain an electron donating compound, and contacting the resulting composite with a titanium halide or a composite of a titanium halide and an electron donating compound, (iii) a process comprising preparing a composite of a magnesium halide and an organic or inorganic compound, which may contain an electron donating compound, and successively contacting the resulting composite with an electron donating compound and a titanium compound in this order or reverse order; or (iv) a process comprising contacting a magnesium compound or a magnesium compound and a titanium compound with an electron donating compound and simultaneously or subsequently contacting with a titanium compound and/or halogenation, provided that a titanium compound must be used in any of the steps.

Solid catalyst component (1) may be prepared as supported on or impregnated in a substance commonly employed as a catalyst carrier, such as silica or alumina.

While the composition of solid catalyst component (1) is arbitrary as long as the effects of the present invention are recognized, a generally recommended composition has an Mg/Ti molar ratio of from 0.1/1 to 1000/1, and preferably from 2/1 to 200/1, and a halogen/Ti molar ratio of from 1/1 to 100/1. The molar ratio of an electron donating compound, if used, to Ti is usually not more than 10/1, and preferably from 0.1/1 to 5/1.

The average particle size of solid catalyst component (1) is also arbitrary as long as the effects of the present invention are secured. In general, it ranges from 0.1 to 200 μm, preferably from 1 to 100 μm, and more preferably from 10 to 100 μm.

The organoaluminum compound which is used in the present invention as component (2) typically includes those represented by formula (3) to (6):

$$AlR^6R^7R^8 \quad (3)$$

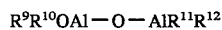

$R^9R^{10}OAl-O-AlR^{11}R^{12}$ (4)

-continued

wherein $R^6$, $R^7$, and $R^8$, which may be the same or different, each represent a hydrogen atom, a halogen atom, or an alkyl group having not more than 12 carbon atom and preferably 1 to 8 carbon atoms, provided that at least one of $R^6$, $R^7$ and $R^8$ is an alkyl group; $R^9$, $R^{10}$, $R^{11}$, $R^{12}$, $R^{13}$, $R^{14}$, $R^{15}$ and $R^{16}$ which may be the same or different, each represent an alkyl group having not more than 12 carbon atoms, preferably 1 to 8 carbon atoms; and n represents an integer of 1 to 100.

Typical examples of the organoaluminum compounds represented by formula (3) include trialkylaluminum compounds, e.g., trimethylaluminum, triethylaluminum, tripropylaluminum, tributylaluminum, trihexylaluminum, and trioctylaluminum; alkylaluminum hydrides, e.g., diethylaluminum hydride and diisobutylaluminum hydride; and alkylaluminum halides, e.g., diethylaluminum chloride, diethylaluminum bromide, ethylaluminum sesquichloride, and ethylaluminum sesquibromide.

Typical examples of the organoaluminum compounds represented by formula (4) are tetraethyldialumoxane and tetrabutyldialumoxane.

The compounds represented by formula (5) or (6) are aluminoxanes which are polymers of an aluminum compound. $R^{13}$ includes methyl, ethyl, propyl, butyl, benzyl, etc., and preferably a methyl or ethyl group; and n is preferably from 1 to 10.

Of these organoaluminum compounds, trialkylaluminum compounds, alkylaluminum hydrides, and alkylalumoxanes produce particularly preferred results.

The organoaluminum compound is used in an olefin polymerization system in a concentration usually of $10^{-4}$ mmol/l or more, and preferably $10^{-2}$ mmol/l or more, and at a molar ratio to Ti in solid catalyst component (1) of at least 0.5/1, preferably at least 2/1, and more preferably at least 10/1. If the amount of the organoaluminum compound is too low, great reduction in polymerization activity results. Too large an amount of the organoaluminum compound in a polymerization system, i.e., 20 mmol/l or more, and too high a molar ratio to Ti, i.e., 1000/1 or more, brings about no further catalytic activity.

Organometallic compound (A) which can be used in the present invention is a compound represented by formula (1):

$$X(R^1)(R^2)(R^3) \quad (1)$$

wherein X represents a boron atom or an aluminum atom; and $R^1$, $R^2$, and $R^3$ each represent a hydrogen atom or a hydrocarbon group (e.g., an alkyl group) having from 3 to 10 carbon atoms such as a propyl group, an isopropyl group, a butyl group, an isobutyl group, a sec-butyl group, a t-butyl group, a pentyl group, a hexyl group, an octyl group, a nonyl group, and a phenyl group. $R^1$, $R^2$, and $R^3$ may be the same or different, and at least one of $R^1$, $R^2$ and $R^3$ is a hydrocarbon group. Specific examples of organometallic compound (A) include (i) organoboron compounds, e.g., tripropylboron, triisopropylboron, tributylboron, triisobutylboron, trihexylboron, triheptylboron, trioctylboron, trinonylboron, triphenylboron, and phenyldichloroboron, and (ii) organoaluminum compounds, e.g., diisobutylaluminum, tripropylaluminum, triisopropylaluminum, tributylaluminum, triisobutylaluminum, triamylaluminum, trihexylaluminum, triheptylaluminum, trioctylaluminum, and trinonylaluminum; with triisobutylboron, triisobutylaluminum, trihexylaluminum, and trioctylaluminum being preferred.

Organosilicon compound (B) which can be used in the present invention is a trialkoxysilane compound having a C3 axis of symmetry in the molecule thereof which is represented by formula (2):

wherein $R^4$ and $R^5$ each represent an alkyl group having from 1 to 3 carbon atoms, i.e., a methyl group, an ethyl group or a propyl group.

Specific examples of organosilicon compound (B) are t-butyltrimethoxysilane, t-butyltriethoxysilane, t-butyltripropoxysilane, t-heptyltrimethoxysilane, t-heptyltriethoxysilane, t-heptyltripropoxysilane, t-decyltrimethoxysilane, t-decyltriethoxysilane, and t-decyltripropoxysilane, with t-butyltrimethoxysilane, t-butyltriethoxysilane, t-heptyltrimethoxysilane, and t-heptyltriethoxysilane being preferred.

Compound (A) and compound (B) are used at an (A)/(B) molar ratio of from 0.5/1 to 5/1, preferably from 0.7/1 to 3/1, and more preferably from 0.8/1 to 1.5/1. If the (A)/(B) molar ratio is less than 0.5/1, the polymerization activity is reduced. If it exceeds 5/1, stereoregularity is reduced. In either case, the molecular weight distribution becomes broad. Compounds (A) or (B) may be used as diluted with a solvent, such as a hydrocarbon, e.g., pentane, hexane, heptane, octane, decane, etc.

The contact temperature between compounds (A) and (B) is preferably not higher than 50° C., and more preferably not higher than 30° C. If the contact temperature exceeds 50° C., reductive decomposition of the organosilicon compound is accelerated, resulting in a reduction in stereoregularity of the resulting polymer.

The contact time between compounds (A) and (B) is preferably from about 1 second to about 10 hours, more preferably from 30 seconds to few hours, and practically from 1 minute to 2 hours. Contact for more than 10 hours tends to induce decomposition reactions. During the contact, the system may be, and is preferably stirred, while not always necessary.

The thus prepared component (3) is used in such an amount that a component (2) to component (3) molar ratio is from 0.001/1 to 5/1, and preferably 0.01/1 to 1/1.

Olefins:

Olefins which are to be polymerized in the present invention generally include those having 12 carbon atoms at the most. Typical examples of olefin are ethylene, propylene, butene-1, 4-methylpentene-1, hexene-1, and octene-1. The present invention is advantageous for stereospecific polymerization of α-olefins containing 3 or more carbon atoms, such as a mixture of these olefins and a mixture of ethylene and such a mixture. The present invention is particularly advantageous for stereospecific polymerization of propylene or a mixture of propylene and up to about 20 mol % based on the total amount of olefin) of ethylene or a higher α-olefin (i.e., having 4 or more carbon atoms), and most advantageous for homopolymerization of propylene.

Polymerization Process and Conditions:

In carrying out the polymerization, the solid catalyst component of the present invention and catalyst component (2), or, these components and catalyst component (3) may be fed to a polymerization vessel separately, or any two or all of them may be mixed beforehand. In a typical embodiment, an inert solvent hereinafter described and catalyst components (2) and (3) are put in a dropping funnel having been purged with nitrogen and, after a lapse of a certain time (about 1 minute or more), the mixture is brought into contact with solid catalyst component (1), followed by allowing to react for a certain time (about 1 minute or more), and the resulting mixture is added to a polymerization vessel. The inert solvent to be used here includes alkanes or cycloalkanes, e.g., pentane, hexane, heptane, n-octane, iso-octane, cyclohexane, and methylcyclohexane; alkyl aromatic hydrocarbons, e.g., toluene, xylene, ethylbenzene, isopropylbenzene, ethyltoluene, n-propylbenzene, diethylbenzene, and a mono- or dialkylnaphthalene; halogenated or hydrogenated aromatic hydrocarbons, e.g., chlorobenzene, chloronaphthalene, o-dichlorobenzene, tetrahydronaphthalene, and decahydronaphthalene; high-molecular weight liquid paraffin; and mixtures thereof.

Polymerization of olefin according to the present invention is carried out under a monomer pressure of atmospheric pressure or higher. While, in gas phase polymerization, the monomer pressure should not be below the vapor pressure of the olefin to be polymerized at a polymerization temperature, the monomer pressure generally ranges from about 20 to 600 PSI.

Polymerization may be conducted in a liquid phase using an inert solvent or a liquid monomer (olefin) or in a gas phase. It may be in a batchwise system, a semi-continuous system or a continuous system. Further, the reaction may be divided into two stages under varied conditions.

For the purpose of adjusting a melt flow of the resulting polymer to a practical level, a molecular weight regulator, generally hydrogen, may be used.

The polymerization time in a batchwise system is usually from 30 minutes to several hours, and the same period of time is taken as an average retention time in a continuous system. In an autoclave type reaction, a typical polymerization time is from about 1 to 4 hours.

In the case of slurry polymerization, the polymerization time is preferably from 30 minutes to several hours.

Examples of suitable diluting solvents which can be used in slurry polymerization include alkanes or cycloalkanes, e.g., pentane, hexane, heptane, n-octane, iso-octane, cyclohexane, and methylcyclohexane; alkyl aromatic hydrocarbons, e.g., toluene, xylene, ethylbenzene, isopropylbenzene, ethyltoluene, n-propylbenzene, diethylbenzene, and a mono- or dialkylnaphthalene; halogenated or hydrogenated aromatic hydrocarbons, e.g., chlorobenzene, chloronaphthalene, o-dichlorobenzene, tetrahydronaphthalene, and decahydronaphthalene; high-molecular weight liquid paraffin; and mixtures thereof; and other well-known diluting solvents.

Gas phase polymerization for which the present invention is useful can be carried out by means of a stirring tank reactor, a fluidized bed reactor system, and the like. A typical reactor system for gas phase olefin polymerization is composed of a reactor equipped with a stirrer in which an olefin monomer and catalyst components can be charged. The catalyst components are added from one or more valve-controlled inlets either altogether or separately. The unreacted monomer withdrawn as an exhaust gas is usually combined with a fresh monomer and returned to the reactor under pressure.

If it is necessary to stop the polymerization reaction or to inactivate the catalyst after completion of polymerization, although such is not necessary in usual cases, the reaction system may be brought into contact with known catalyst poisons, such as water, an alcohol or acetone, or any other appropriate catalyst deactivator.

The polymerization temperature usually ranges from −10° C. to 180° C. A range of from 20° to 100° C. is recommended for obtaining satisfactory catalytic activity and a high production rate. A more preferred temperature is from 50° to 80° C.

With respect to preliminary polymerization, reaction control, working-up of the reaction mixture, and the like, any known technique may be applicable to the process of the present invention without particular restriction.

The present invention will now be illustrated in greater detail with reference to Examples.

A room temperature xylene-soluble matter (XSRT; %) of a polymer was determined by heat-solubilizing a polymer in xylene at 135° C., cooling, and filtering. The insoluble residue substantially corresponds to an isotactic index of the polymer which is decided by extraction from boiling n-heptane. The lower XSPT value implies the high stereoregularity.

The melting point (Tmp; °C.) of a polymer was determined from the top of the peak of fusion as measured with DSC-7 manufactured by Perkin-Elmer Co. in second temperature rise (20° C./min).

In Examples and Comparative Examples, MFR (melt index under a load of 2.16 kg) and HLMFR (melt index under a load of 10 kg) were measured in accordance with JIS K-6758-1968. The higher the HLMFR/MFR value of an olefin polymer, the broader the molecular weight distribution.

The initial flexural modulus (FM) was measured in accordance with ASTM D-790-66.

In all Examples, all the compounds used in preparation of a solid catalyst component and in polymerization, such as organic solvents, olefins, hydrogen, titanium compounds, magnesium compounds, silicon compounds, boron compounds, etc., were those from which a water content had been substantially removed.

Further, the preparation of a solid catalyst component and the polymerization were carried out in a substantially water-free nitrogen atmosphere.

In carrying out polymerization, each of an organoaluminum compound, compound (A), and compound (B) was used as a hexane solution in a concentration of 1 mol/l, 0.1 mol/l, and 0.1 mol/l, respectively.

EXAMPLE 1

Preparation of Solid Ti Catalyst Component (1):

1.71 g of anhydrous magnesium chloride, 9 ml of decane, and 8.4 ml of 2-ethylhexyl alcohol were heated at 130° C. for 3 hours to form a homogenous solution. To the solution was added 0.39 g of phthalic anhydride, and the mixture was heated at 130° C. for 2 hours with stirring to dissolve the phthalic anhydride. The resulting homogenous solution after being cooled to room temperature was added dropwise to 72 ml of titanium tetrachloride kept at −20° C. over a period of 1 hour. After the addition, the mixture was heated over 4 hours up to 110° C., at which 1.01 g of ethyl 3-benzoylpropionate was added thereto, followed by stirring at that temperature for 2 hours. After completion of the reaction, the reaction mixture was filtered while hot, and the collected solid was re-suspended in 72 ml of titanium tetrachloride, followed by heating at 110° C. for 2 hours. The reaction mixture was again filtered while hot, and the collected solid was thoroughly washed with decane and hexane until no free titanium compound was detected from the washing, and dried under reduced pressure.

Preparation of Catalyst Component (3):

In 30 ml of hexane were added 0.4 ml of a 0.1 mol/l hexane solution of trioctylaluminum and 0.4 ml of a 0.1 mol/l hexane solution of t-butyltrimethoxysilane, and the mixture was stirred at room temperature (25° C.) for 5 minutes to prepare catalyst component (3).

Polymerization:

In a 1.5 l-volume stainless steel-made autoclave were charged 4.8 mg of the above-prepared solid catalyst component (1), the above-prepared catalyst component (3), and, as catalyst component (2), 0.8 ml of a 1 mol/l hexane solution of triethylaluminum (triethylaluminum content: 91 mg), and 340 g of propylene and 0.03 g of hydrogen were then introduced thereinto.

The inner temperature of the autoclave was elevated and kept at 80° C. One hour later, the gas was released to complete the polymerization. The results of the polymerization reaction are shown in Table 2 below.

EXAMPLES 2 TO 5 AND COMPARATIVE EXAMPLES 1 TO 6

Preparation of catalyst components and polymerization were carried out in the same manner as in Example 1, except for altering the conditions for preparing catalyst component (3) as shown in Table 1.

EXAMPLES 6 TO 18 AND COMPARATIVE EXAMPLES 7 TO 10

Preparation of catalyst components and polymerization were carried out in the same manner as in Example 1, except for changing the kinds of compounds (A) and (B) of catalyst component (3) as shown in Table 1.

The results are shown in Table 2.

TABLE 1

| Example No. | Compound (A) Kind | Compound (A) Amount (ml) | Compound (B) Kind | Compound (B) Amount (ml) | Contact Time (min) | Contact Temp. |
|---|---|---|---|---|---|---|
| Example 1 | trioctylaluminum | 0.4 | t-butyltrimethoxysilane | 0.4 | 5 | room temp. |
| Example 2 | " | 0.8 | " | 0.8 | " | " |
| Example 3 | " | 2.4 | " | 2.4 | " | " |
| Example 4 | " | 0.8 | " | 0.8 | 10 | " |
| Example 5 | " | 0.8 | " | 0.8 | 5 | 0° C. |
| Compar. Example 1 | none | 0.0 | " | 0.8 | " | room temp. |
| Compar. | trioctylaluminum | 0.8 | none | 0.0 | " | " |

TABLE 1-continued

| Example No. | Compound (A) Kind | Compound (A) Amount (ml) | Compound (B) Kind | Compound (B) Amount (ml) | Contact Time (min) | Contact Temp. |
|---|---|---|---|---|---|---|
| Example 2 Compar. Example 3 | " | 0.8 | t-butyltrimethoxysilane | 0.8 | " | 80° C. |
| Compar. Example 4 | " | 0.8 | " | 0.8 | 12 | room temp. |
| Compar. Example 5 | " | 0.08 | " | 0.8 | 5 | " |
| Compar. Example 6 | " | 4.8 | " | 0.8 | " | " |
| Example 6 | triisobutylboron | 0.4 | " | 0.4 | " | " |
| Example 7 | " | 0.8 | " | 0.8 | " | " |
| Example 8 | triisobutylboron | 2.4 | t-butyltrimethoxysilane | 2.4 | 5 | room temp. |
| Example 9 | triisobutylaluminum | 0.4 | t-heptyltrimethoxysilane | 0.4 | " | " |
| Example 10 | " | 0.8 | " | 0.8 | " | " |
| Example 11 | " | 2.4 | " | 2.4 | " | " |
| Example 12 | triisobutylboron | 0.4 | " | 0.4 | " | " |
| Example 13 | " | 0.8 | " | 0.8 | " | " |
| Example 14 | " | 2.4 | " | 2.4 | " | " |
| Example 15 | triisobutylaluminum | 0.8 | t-butyltrimethoxysilane | 0.8 | " | " |
| Example 16 | trihexylaluminum | 0.8 | " | 0.8 | " | " |
| Example 17 | trioctylaluminum | 0.8 | t-heptyltrimethoxysilane | 0.8 | " | " |
| Example 18 | trihexylaluminum | 0.8 | " | 0.8 | " | " |
| Compar. Example 7 | trioctylaluminum | 0.8 | i-butyltrimethoxysilane | 0.8 | " | " |
| Compar. Example 8 | " | 0.8 | n-butyltrimethoxysilane | 0.8 | " | " |
| Compar. Example 9 | triethylaluminum | 0.8 | t-butyltrimethoxysilane | 0.8 | " | " |
| Compar. Example 10 | " | 0.8 | t-heptyltrimethoxysilane | 0.8 | " | " |

TABLE 2

| Example No. | Activity (g/gH) | XSRT (%) | MFR (g/10 min) | HLMFR /MFR | Tmp (°C.) | FM (kg/cm$^2$) |
|---|---|---|---|---|---|---|
| Example 1 | 17200 | 2.0 | 14.5 | 17.4 | 164.0 | 16600 |
| Example 2 | 16000 | 1.3 | 13.8 | 17.5 | 164.5 | 17000 |
| Example 3 | 13400 | 1.1 | 13.8 | 16.9 | 164.5 | 17100 |
| Example 4 | 15100 | 1.4 | 14.9 | 18.3 | 163.1 | 15800 |
| Example 5 | 16500 | 0.7 | 15.0 | 17.0 | 165.6 | 17200 |
| Compar. Example 1 | 15800 | 3.5 | 12.6 | 19.3 | 164.1 | 15700 |
| Compar. Example 2 | 22000 | 46.4 | 56.0 | 14.4 | 151.0 | 11100 |
| Compar. Example 3 | 20500 | 4.5 | 14.0 | 22.0 | 159.0 | 15200 |
| Compar. Example 4 | 11000 | 4.1 | 13.9 | 21.6 | 160.0 | 14600 |
| Compar. Example 5 | 14500 | 3.6 | 13.4 | 21.6 | 163.3 | 15500 |
| Compar. Example 6 | 8900 | 2.6 | 10.9 | 20.9 | 164.6 | 14600 |
| Example 6 | 16600 | 2.1 | 13.1 | 18.2 | 163.1 | 15900 |
| Example 7 | 15200 | 2.0 | 13.8 | 17.7 | 164.9 | 16000 |
| Example 8 | 14900 | 2.0 | 15.0 | 17.1 | 164.2 | 16000 |
| Example 9 | 19800 | 0.8 | 12.1 | 18.6 | 163.1 | 15500 |
| Example 10 | 18000 | 0.6 | 12.7 | 18.0 | 163.5 | 16100 |
| Example 11 | 17300 | 0.6 | 12.0 | 18.0 | 163.8 | 15900 |
| Example 12 | 17500 | 2.3 | 13.3 | 16.8 | 164.2 | 16200 |
| Example 13 | 17300 | 2.1 | 13.6 | 16.6 | 164.5 | 16200 |
| Example 14 | 17300 | 1.8 | 12.5 | 17.0 | 164.6 | 16000 |
| Example 15 | 16900 | 1.5 | 12.5 | 18.5 | 165.1 | 15700 |
| Example 16 | 16300 | 1.5 | 12.9 | 18.5 | 163.9 | 15600 |
| Example 17 | 17800 | 0.9 | 12.1 | 17.1 | 163.1 | 14800 |
| Example 18 | 15900 | 0.8 | 12.6 | 17.6 | 164.4 | 15200 |
| Compar. Example 7 | 13800 | 1.5 | 13.8 | 21.3 | 162.0 | 15100 |
| Compar. Example 8 | 10900 | 3.4 | 15.6 | 20.9 | 161.5 | 14600 |
| Compar. Example 9 | 14400 | 3.0 | 14.4 | 20.6 | 163.9 | 15900 |
| Compar. Example 10 | 17100 | 2.8 | 14.0 | 21.1 | 164.4 | 16000 |

According to the present invention, an olefin polymer having high stereoregularity and narrow molecular weight distribution can be economically obtained, as seen from the results described above. The present invention is particularly advantageous in the field of injection molding.

While the invention has been described in detail and with reference to specific embodiments thereof, it will be apparent to one skilled in the art that various changes and modifications can be made therein without departing from the spirits and scope thereof.

What is claimed is:

1. A catalyst for polymerization of an olefin, comprising:
   (1) a solid catalyst component essentially containing titanium, magnesium, and a halogen atom,
   (2) an organoaluminum compound, and
   (3) a contact product obtained by contacting (A) an organometallic compound selected from the group consisting of triisobutylboron, triisobutylaluminum, trihexylaluminum and trioctylaluminum, and (B) an organosilicon compound selected from the group consisting of t-butyltrimethoxysilane and t-heptyltrimethoxysilane, at an (A) to (B) molar ratio of from 0.5/1 to 5/1 at a temperature of not higher than 50° C. for a contact time of not more than 10 hours.

2. The catalyst as in claim 1, wherein said organometallic compound (A) is triisobutylboron.

3. The catalyst as in claim 1, wherein said component (3) is obtained by contacting compounds (A) and (B) at a temperature of not higher than 30° C. for a contact time of from 1 minute to 2 hours.

4. The catalyst as in claim 1, wherein said component (2) is an organoaluminium compound represented by formula (3), (4), (5) or (6):

$$AlR^6R^7R^8 \quad (3)$$

$$R^9R^{10}OAl-O-AlR^{11}R^{12} \quad (4)$$

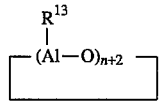
(5)

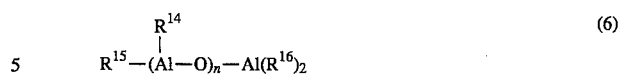

wherein $R^6$, $R^7$ and $R^8$ each represent a hydrogen atom, a halogen atom, or an alkyl gourp having not more than 12 carbon atoms, provided that at least one of $R^6$, $R^7$ and $R^8$ is an alkyl group; $R^9$, $R^{10}$, $R^{11}$, $R^{12}$, $R^{13}$, $R^{14}$, $R^{15}$ and $R^{16}$, each represent an alkyl group having not more than 12 carbon atoms; and n represents an integer of 1 to 100.

5. The catalyst as in claim 4, wherein said component (2) is a trialkylaluminium compound, an alkylaluminium hydride, or an alkylalumoxane.

6. The catalyst as in claim 1, wherein said component (1) has an Mg/Ti molar ratio of from 0.1/1 to 1000/1 and a halogen/Ti molar ratio of from 1/1 to 100/1.

7. The catalyst as in claim 6, wherein said component (1) has an Mg/Ti molar ratio of from 2/1 to 200/1.

8. The catalyst as in claim 1, wherein said component (1) further contains an electron donating compound selected from the group consisting of alcohols, phenols, ketones, aldehydes, organic acid esters, alkoxy acid esters, ketonic acid esters, inorganic acid esters, ethers, acid amides, acid halides, amines, nitriles, thiols, thioethers, sulfuric esters, sulfonic acids, and silicon-containing compounds.

9. The catalyst as in claim 8, wherein said component (1) has a molar ratio of the electron donating compound to Ti of not more than 10/1.

10. The catalyst as in claim 1, wherein said component (2) is contained at a molar ratio to Ti in said component (1) of at least 0.5/1 and at a molar ratio to said component (3) of from 0.001/1 to 5/1.

11. The catalyst as in claim 10, wherein said component (2) is contained at a molar ratio to Ti in said component (1) of at least 2/1 and at a molar ratio to said component (3) of from 0.01/1 to 1/1.

* * * * *